US008317063B2

(12) United States Patent
Alluigi

(10) Patent No.: US 8,317,063 B2

(45) Date of Patent: Nov. 27, 2012

(54) ANTI-UNSCREWING SYSTEM BETWEEN A DISPENSER HEAD AND A CONTAINER

(75) Inventor: Riccardo Alluigi, Alessandria (IT)

(73) Assignee: Guala Dispensing S.p.A., Spinetta Marengo, Alessandria (IT)

( * ) Notice: Subject to any disclaimer, the term of this patent is extended or adjusted under 35 U.S.C. 154(b) by 446 days.

(21) Appl. No.: 12/642,243

(22) Filed: Dec. 18, 2009

(65) Prior Publication Data

US 2010/0155425 A1 Jun. 24, 2010

(30) Foreign Application Priority Data

Dec. 19, 2008 (IT) .............................. BS2008A0234

(51) Int. Cl.
*B67B 1/00* (2006.01)
*G01F 11/00* (2006.01)

(52) U.S. Cl. .............. 222/153.09; 222/321.8; 222/383.1

(58) Field of Classification Search ............. 222/153.09, 222/153.1, 320–321.9, 372, 383.1, 568; 239/333, 239/337, 526
See application file for complete search history.

(56) References Cited

U.S. PATENT DOCUMENTS

| | | | | |
|---|---|---|---|---|
| 4,361,256 | A * | 11/1982 | Corsette | 222/383.1 |
| 4,815,663 | A * | 3/1989 | Tada | 239/333 |
| 4,940,186 | A * | 7/1990 | Tada | 239/337 |
| 5,609,299 | A * | 3/1997 | Foster et al. | 239/304 |
| 5,873,496 | A * | 2/1999 | Montaner et al. | 222/153.09 |
| 5,947,341 | A * | 9/1999 | Montaner et al. | 222/340 |
| 6,869,027 | B2 * | 3/2005 | Foster et al. | 239/304 |
| 7,175,056 | B2 * | 2/2007 | Buti | 222/383.1 |
| 7,306,122 | B2 * | 12/2007 | Stark et al. | 222/383.1 |
| 2002/0066802 | A1 * | 6/2002 | Tada | 239/333 |
| 2007/0131718 | A1 * | 6/2007 | Bistolfi | 222/189.09 |
| 2009/0308896 | A1 * | 12/2009 | Stark | 222/333 |

FOREIGN PATENT DOCUMENTS

| | | |
|---|---|---|
| EP | 0097094 | 12/1983 |
| EP | 0437008 | 7/1991 |
| GB | 2143286 | 2/1985 |

* cited by examiner

*Primary Examiner* — Kevin P Shaver
*Assistant Examiner* — Patrick M Buechner
(74) *Attorney, Agent, or Firm* — Shoemaker and Mattare

(57) ABSTRACT

A connection system between a dispenser head of a liquid and a container of a liquid includes a base area of a structure and a flange screwed tight onto the neck of the container. Free rotation of the structure is prevented by a resistant torque, but the base area of the structure is made in such a way as to allow the accidental rotation of the head without unscrewing the flange.

10 Claims, 4 Drawing Sheets

ANTI-UNSCREWING SYSTEM BETWEEN A DISPENSER HEAD AND A CONTAINER

FIELD OF THE INVENTION

The object of the present invention is an anti-unscrewing connection system between the dispenser head and the container of a dispenser device of a liquid, e.g. trigger operated.

BACKGROUND OF THE INVENTION

Usually, the dispenser head, in which are housed the means that permit the suction of the liquid and its outside dispensing, when operated by the trigger, is connected to the neck of the container by screwing up.

This connection system is of very simple construction and the most widespread in the sector.

Nevertheless, above all during transport operations, the dispenser device is subject to repeated vibrations and sometimes occasional knocks; these external factors affect the screwing up in the sense that they cause its release.

This fact is particularly undesired, due to the consequent loss of liquid contained in the device.

An example of a dispensing device with an head suitable to idly rotate on a container is disclosed in EP-A-0097094; anyway, the joining system disclosed in such document has an high uncertainty on repeatability of the results.

SUMMARY OF THE INVENTION

The object of the present invention is to make a connection system between the dispenser head and the container of a dispenser device, e.g. trigger operated, that overcomes the drawbacks spoken about with reference to the state of the art and satisfies the above requirements.

Such object is achieved by a connection system between a dispenser head of a liquid and a container of the liquid, comprising:

a base area of a structure of the head and a neck of the container;

a flange firmly screwed to the neck of the container, wherein unscrewing occurs by applying an unscrewing torque, wherein the flange comprises an annular lip which engages the base area of the structure binding it axially to the same;

wherein the free rotation of the structure is prevented by a torque resistant to rotation developed by the contact of the base area of the structure; and wherein the base area of the structure is made in such a way that the torque resistant to rotation is inferior to the unscrewing torque, to enable the accidental rotation of the head without unscrewing the flange.

DESCRIPTION OF THE PREFERRED EMBODIMENTS

Figure 1:
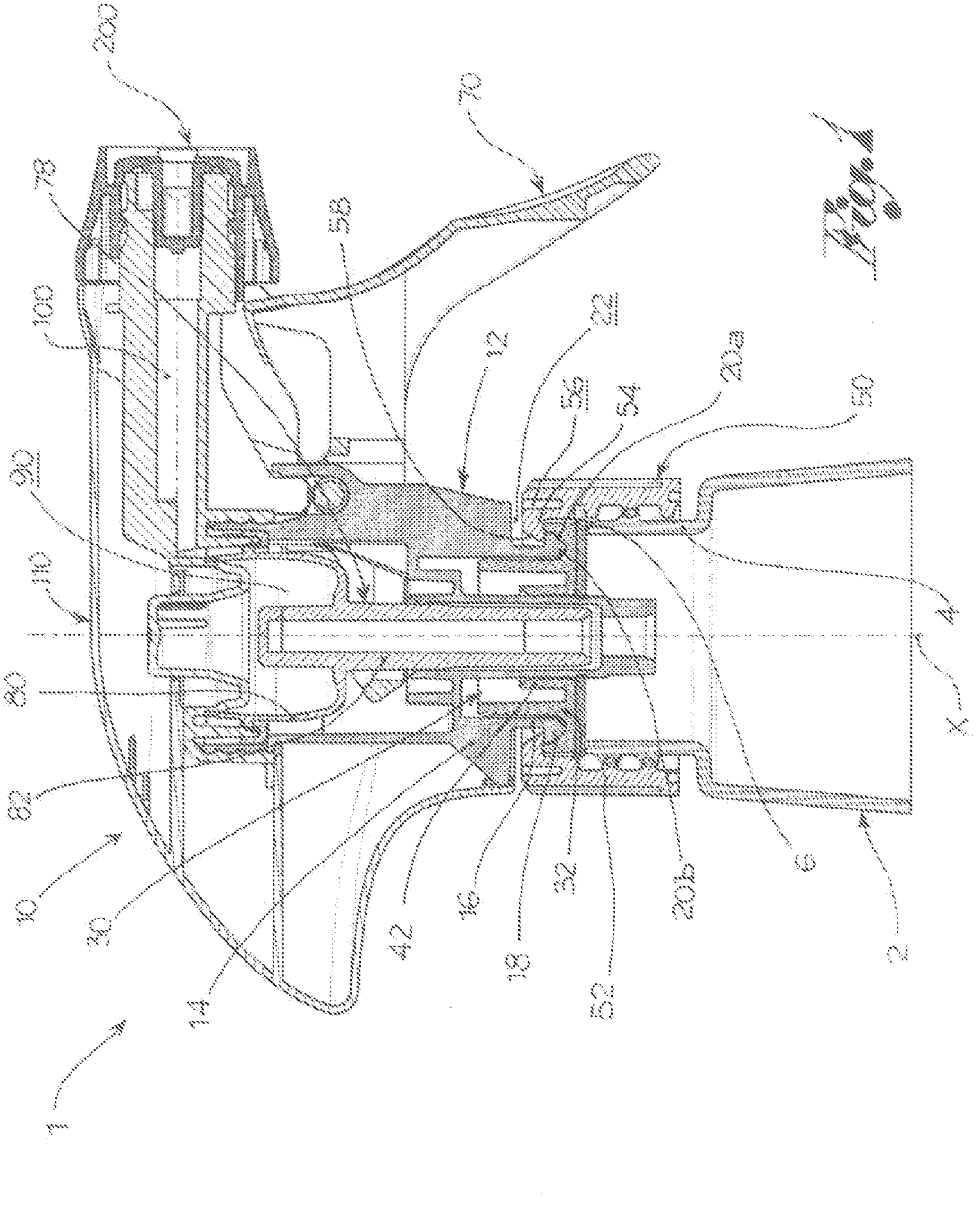
FIG. 1 represents a section view of the dispenser device, which integrates the connection system according to an embodiment variation of the invention.
Figure 2:
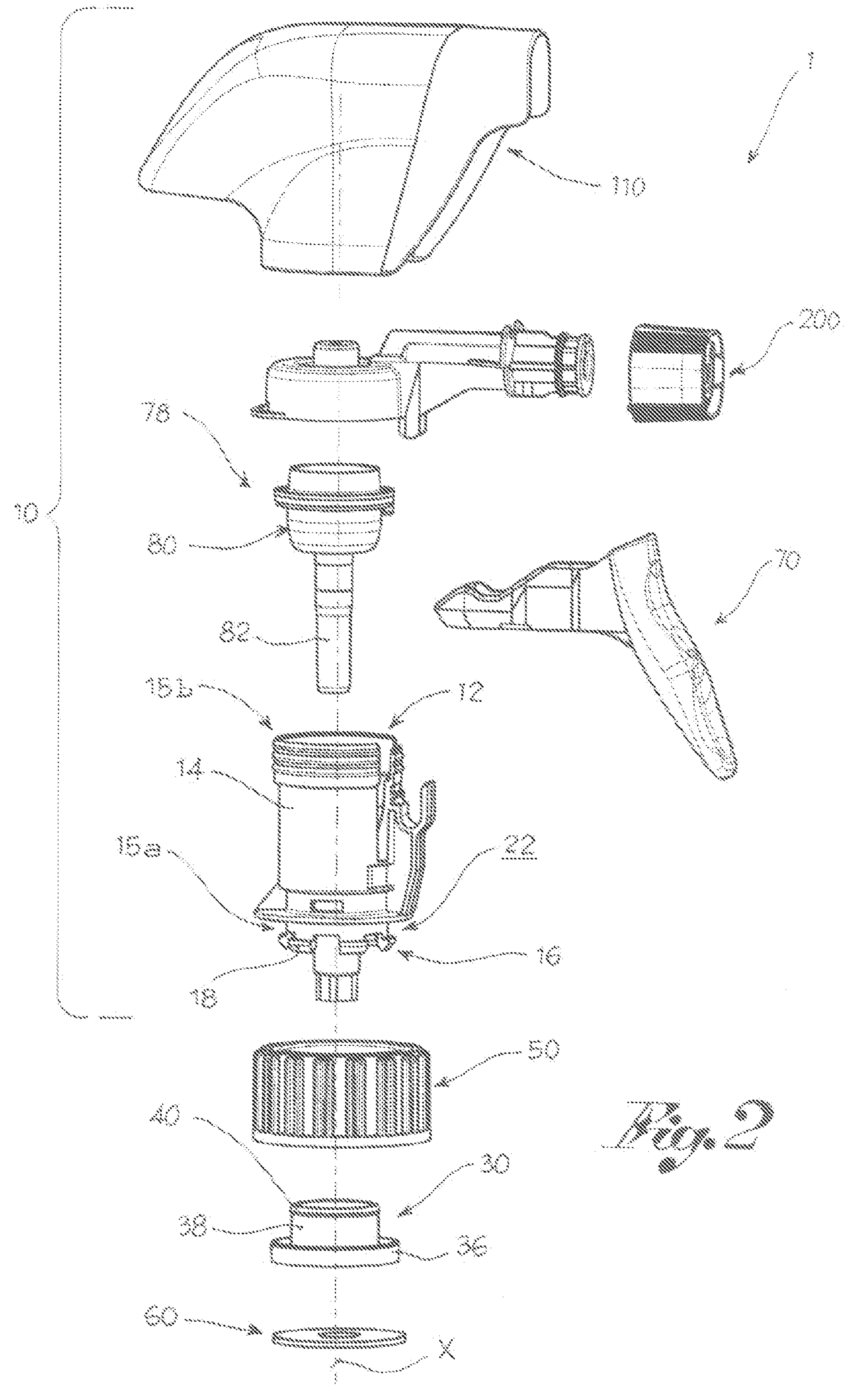
FIG. 2 shows a separate-part view of a dispenser head and of a closing flange of the device in FIG. 1.
Figure 3:
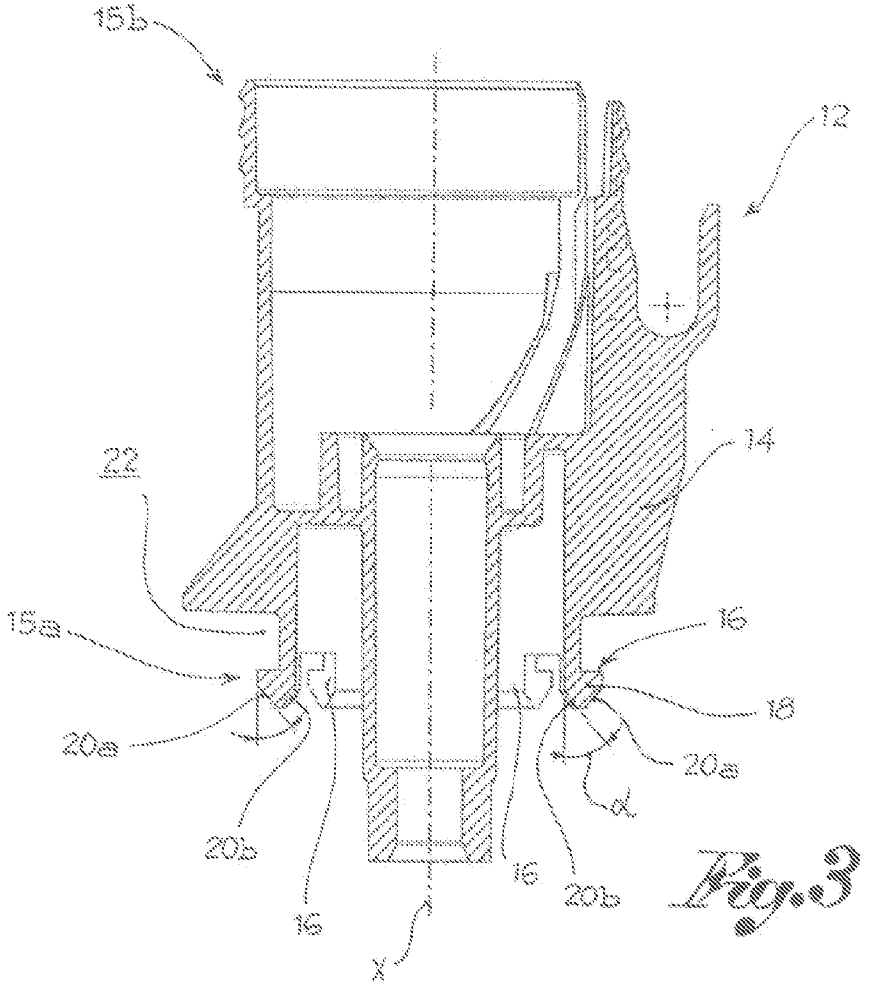
FIG. 3 shows a section view of a structure of the dispenser head in FIG. 2.
Figure 4:
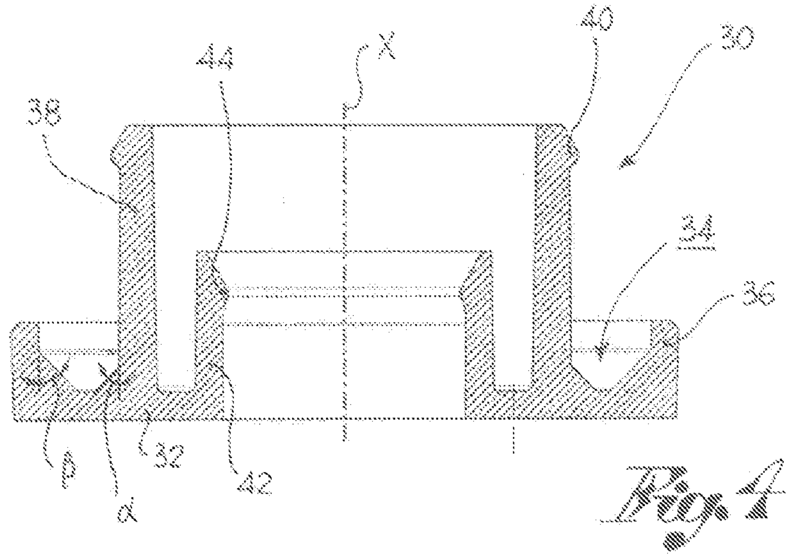
FIG. 4 represents a section view of an intermediate body of the dispenser head in the FIG. 2.
Figure 5:
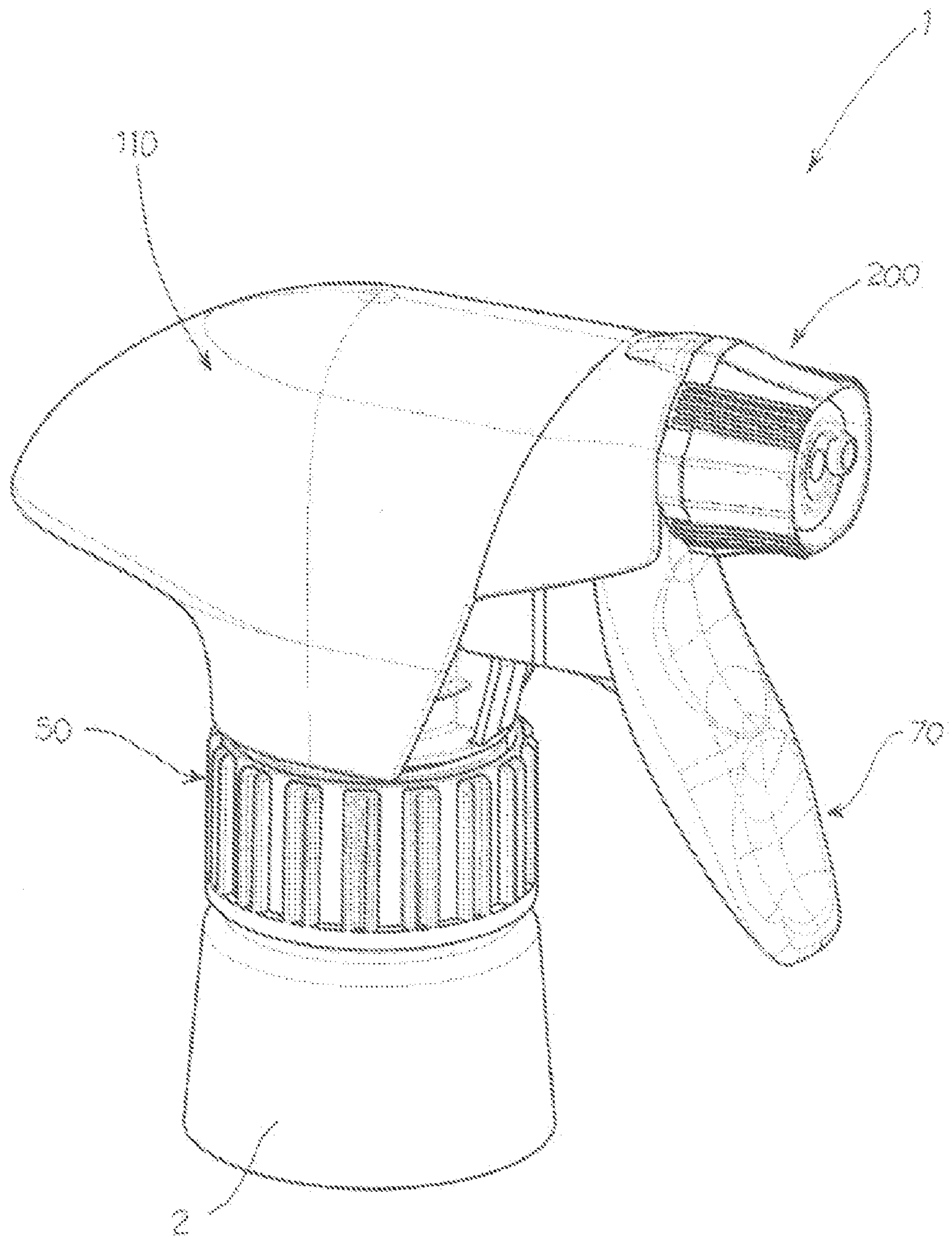
FIG. 5 shows the dispenser device of the FIG. 1 with assembled parts.

With reference to the attached illustrations, by 1 has been generally indicated a dispenser device of a liquid.

The device 1 comprises a container 2 for containing liquid to be dispensed, comprising a neck 4 defining a mouth for accessing the inside of the container. The neck 4 has a container axis X.

In particular, the mouth of the neck 4 is delimited by a support crown 6, e.g., lying on a plane perpendicular to the container axis X.

The device 1 includes a dispenser head 10 associable with the container 2, and in particular with the neck 4 of this.

The dispenser head 10 comprises a supporting structure 12 to which are variably connected the head components.

The structure 12 comprises a structure body 14, elongated along the container axis X, between a base area 15*a* close to the mouth of the container and an opposite summit area 15*b*, spaced out along the container axis X.

In particular, the structure 12, in the base area, is fastened to the container by means of a connection system comprising at least a protruding leg 16, overhanging from the structure body 14 along the container axis X.

In the embodiment represented, a plurality of legs 16 are envisaged, arranged in a ring, angularly spaced out from each other.

The leg 16, at the opposite extremity to the structure body 14 from which it overhangs, has an annular flap 18, protruding outwards radially, so as to form a hook pattern.

In other words, the annular flap 18 consists of a radial relief towards the outside at the free end of the leg.

The annular flap 18 gradually slims down towards the bottom, meaning distally from the structure body, so as to offer a limited contact surface with the other components of the device.

In particular, the flap 18 is delimited on the bottom by a pair of support surfaces 20*a*, 20*b* converging towards the bottom, each with truncated cone shape, so as to create a thickness that slims towards the extremity.

According to a preferred embodiment, the support surface 20*b*, which is turned towards the inside, forms an angle $\alpha$ with the direction of the container axis X between 50° and 30°, preferably 40°. The support surface 20*a* forms an angle $\beta$ with the container axis.

Between the flap 18 and the structure body 14 an interspace 22 is created.

The connection system between the dispenser head 10 and the container 2 also comprises an intermediate body 30 comprising an annular support base 32, ring shaped.

Above the annular base 32, the intermediate body 30 also has an annular seat 34, suitable for accommodating the base area 15*a* of the structure, and in particular the flap 18 of the legs 16.

Preferably, the annular seat 34 is counter-shaped with respect to the extremity of the structure, meaning shaped following the pattern of the two support surfaces 20*a*, 20*b* of the flap 18.

Preferably, the opening corner of the surfaces of the annular seat 34 is greater than the angle formed between the support surfaces 20*a*, 20*b* of the flap 18, meaning the seat is more open than the extremity of the flap 18.

For example, in a preferred embodiment, the surfaces of the annular seat form angles between 50° and 30°, preferably equal to 45°, with the direction of the container axis X.

Preferably, the intermediate body 30 comprises an annular outer defining wall 36, protruding axially from the annular base 32, on which faces the support surface 20*a* of the annular flap 18.

Preferably, furthermore, the intermediate body 30 comprises an annular engagement wall 38, radially spaced out internally from the outer defining wall 36, and preferably with greater axial extension.

Facing onto the engagement wall 38 is the other support surface 20*b* of the annular flap 18.

By preference, the engagement wall 38 diverges as it moves away from the annular base 32.

Preferably, furthermore, in the proximity of the free extremity, distal from the annular base 32, the engagement wall 38 comprises an external annular protrusion 40.

The annular seat 34 is arranged between the outer defining wall 36 and the engagement wall 38.

According to a preferred embodiment furthermore, the intermediate body 30 comprises an inner defining wall 42, protruding axially from the annular base 32, radially inside the engagement wall 38, arranged around the through opening of the ring-shaped base 32.

Preferably, furthermore, in the proximity of the free extremity, distal from the annular base 32, the inner defining wall 42 comprises an internal annular protrusion 44.

The connection system also comprises a closing flange 50 suitable for screwing onto the neck 4 of the container 2.

As some laboratory tests have shown, the screwing torque of the flange on the neck, i.e. the unscrewing torque, is generally comprised between 30 N·cm and 120 N·cm, preferably between 40 N·cm and 90 N·cm, generally equal to 60 or 50 N·cm.

The flange 50 comprises an annular side wall 52, having internal threading and, by preference, on the outside, a knurled gripping surface.

The flange 50 also comprises an annular lip 54, radially internally protruding from the side wall 52.

The lip 54 is flexible for interference with the base of the structure 12; in particular, the lip 54 is flexible in the sense of being suitable for expanding radially outwards.

E.g., the flange 50 has a crack 56, arranged radially outside the lip 54, all around this, so that it is structurally weakened.

Preferably, furthermore, the lip 54 has an invitation chamfer 58, to invite fitting the base area 15*a* of the structure 12.

The connection system also comprises a crown-shaped seal support 60, flat.

The seal support is resting on the crown of the mouth of the container 2 and on this rests the intermediate body 30 with its own annular base 32.

The dispenser head 10 is fitted on the intermediate body 30.

In particular, the base area 15*a* rests on the neck 4, e.g., by means of the intermediate body 30.

In particular, the legs 16 of the structure 12 rest inside the annular seat 34, so the flap 18 is accommodated in the annular seat.

The engagement wall 38 penetrates inside the structure, so that the annular protrusion 40 is in contact with the inner surface of the leg 16 of the structure 12, creating a hook.

The flange 50 is screwed onto the neck 4 of the container 2 and the lip 54 is arranged in the inter-space 22 between the flap 18 and the structure body 14.

The lip 54 has a radial extension inwards such as to radially pass beyond the outer defining wall 36, so as to engage with its portion the flap 18 to secure it axially.

In other words, the lip 54 pushes the flap 18 into the annular seat 34 and keeps the intermediate body 30 and the seal support 60 on the neck 4 of the container 2.

The dispenser head 10 also comprises operating means for dispensing the liquid outside. For example, the operating means comprise a trigger 70, connected to the structure 12, to rotate.

The dispenser head 10 also comprises means of suctioning the liquid from the container and for dispensing it outside.

For example, the suction and dispensing means comprise a pumping element 78 consisting of a deformable diaphragm 80, supported in the structure 12, and of a rod 82, sliding inside the structure 12, dragged by the deforming diaphragm 80.

The diaphragm 80 is engageable with the trigger 70 to be deformed.

The membrane 80 delimits a pressure chamber 90, in connection with a dispensing pipe 100 with outside outlet.

Preferably, furthermore, the dispenser head 10 comprises a nozzle 200, arranged at the extremity of the dispenser pipe 100, turnable to open and close the pipe.

Preferably, furthermore, the dispenser head 10 comprises valve means for adjusting the suction and the dispensing of the liquid.

Furthermore, preferably, the dispenser head 10 comprises a covering 110, supported by the structure 12, inside which are contained the suction and dispenser means and the valve means.

The structure 12, though firmly connected to the container by the screwing up of the flange 50, is in contact with the components, the rotation of which is blocked, only on limited surface portions.

In particular, the flaps 18 of the legs 16 are in contact with the lip 54 of the flange 50 only for the part of this protruding radially internally from the outer defining wall 36.

Furthermore, the flap 18 is in contact with the bottom of the annular seat 34 only on a limited surface deriving from exiguous chamfers and from the deformation of the materials, inasmuch as the sloping surfaces of the annular seat 34 have different slope angles compared to the support surfaces 20*a*, 20*b* of the flap.

Furthermore, the contact between the engagement wall 38 and the frame is limited to the protrusion 40.

Consequently, vibrator phenomena or accidental knocks affecting the dispenser head cause the head to rotate with respect to the container; such rotation is not however transmitted to the flange, which remains firmly screwed onto the container neck.

Innovatively, the connection system according to the present invention is particularly reliable inasmuch as it avoids or strongly limits the accidental unscrewing of the flange.

Advantageously, furthermore, the connection system is releasable, to allow topping up the container or its replacement.

It is obvious that a technician in the field, in order to satisfy contingent requirements, could make changes to the dispenser device or to the connection system described above.

For example, the operating trigger, in a variation of embodiment, is translatable to start the dispensing of the liquid Such variations are also contained within the protection scope as defined by the following claims.

What is claimed is:

1. A system for connecting a dispenser head having a body structure to a liquid container having a threaded neck and a longitudinal axis, said system comprising:

a base area on the body structure, facing the neck of the container;

an intermediate body positioned between the base area of the structure and the neck of the container, said intermediate body having an annular seat which accommodates the base area, a flange firmly screwed to the neck of the container, wherein unscrewing occurs by applying an unscrewing torque, wherein the flange comprises an annular lip which engages the base area of the body structure binding it axially to the same;

whereby free rotation of the flange is prevented by a torque resistant to rotation developed by contact between the intermediate body and the base area of the body structure; and wherein the torque resistant to rotation is less than the unscrewing torque, to permit accidental rotation of the head without unscrewing the flange, the annular lip of the flange presses the intermediate body towards the neck and the base area into the annular seat of the intermediate body and the intermediate body comprises an outer defining wall, radially positioned outside the base area, and on which the annular lip acts, and the annular lip has an inward radial extension extending beyond the outer defining wall to also engage the base area.

2. System according to claim 1, wherein the base area comprises a number of angularly spaced legs.

3. System according to claim 2, wherein each said leg comprises a flap protruding outwards radially, in contact with the lip of the flange.

4. System according to claim 3, wherein the flap has, at its extremity, a pair of converging support surfaces.

5. System according to claim 4, wherein the converging support surfaces of the flap form an angle of 30° to 50° with the longitudinal axis of the container.

6. System according to claim 5, wherein the converging support surfaces of the flap form an angle of about 40° with the longitudinal axis of the container.

7. System according to claim 6, wherein the annular seat of the intermediate body has divergent sloping sides, to accommodate the base area.

8. System according to claim 7, wherein the divergent sloping sides of the annular seat form an angle of 30° to 50° with the longitudinal axis of the container.

9. System according to claim 8, wherein said angle of the divergent sloping sides of the annular seat is about 45°.

10. A dispenser head for a liquid container having a threaded neck, said dispenser head comprising an upper body having a base facing the container, said base comprising a plurality of circumferentially spaced legs, each leg having a top surface and a pair of converging sloping surfaces at a bottom thereof, an intermediate body positioned between the upper body and the neck of the container, said intermediate body having an annular seat facing the upper body, in which the converging sloping surfaces of the legs seat, and a flange which can be screwed onto the neck of the container to secure the head to the container, and unscrewed therefrom by applying a predetermined unscrewing torque, said flange having an annular lip which engages the base of the upper body and the intermediate body, drawing the legs of the upper body into contact with the annular seat on the intermediate body, so that free rotation of the main body is resisted by a resistance torque, said seat and said sloping sides of the legs having angles selected so that said resistance torque is less than said unscrewing torque, to keep accidental rotation of the head from unscrewing the flange.

* * * * *